United States Patent [19]
Neltoft

[11] Patent Number: 5,859,372
[45] Date of Patent: Jan. 12, 1999

[54] DEVICE FOR USE IN MANUAL CONTROL OF THE MOVEMENT OF A REAL OR IMAGINARY OBJECT

[76] Inventor: Peter Neltoft, Sorgenfrigardsvej 56, DK-2800 Lyngby, Denmark

[21] Appl. No.: 727,397
[22] PCT Filed: Apr. 11, 1995
[86] PCT No.: PCT/DK95/00152
§ 371 Date: Dec. 26, 1996
§ 102(e) Date: Dec. 26, 1996
[87] PCT Pub. No.: WO95/27890
PCT Pub. Date: Oct. 19, 1995

[30] Foreign Application Priority Data

Apr. 11, 1994 [DK] Denmark ................. 0405/94

[51] Int. Cl.⁶ ............................................. G01L 5/22
[52] U.S. Cl. ..................... 73/862.043; 73/862.05; 74/471 XY; 250/221; 250/229
[58] Field of Search ............. 73/865.9, 862.043, 73/862.044, 862.05; 250/221, 229; 74/471 XY

[56] References Cited

U.S. PATENT DOCUMENTS

| | | | |
|---|---|---|---|
| 4,046,005 | 9/1977 | Goroski ...................... | 73/862.05 X |
| 4,607,159 | 8/1986 | Goodson et al. .............. | 250/221 |
| 4,660,828 | 4/1987 | Weiss ........................ | 482/123 |
| 4,809,557 | 3/1989 | Maurer et al. ............... | 73/862.322 |
| 4,876,524 | 10/1989 | Jenkins ..................... | 73/862.05 X |
| 5,168,221 | 12/1992 | Houston ..................... | 73/779 X |
| 5,222,400 | 6/1993 | Hilton ....................... | 73/862.043 |
| 5,264,768 | 11/1993 | Gregory et al. .............. | 74/471 XY |

FOREIGN PATENT DOCUMENTS

| | | |
|---|---|---|
| 151479 | 8/1985 | European Pat. Off. . |
| 9120022 | 12/1991 | European Pat. Off. . |

OTHER PUBLICATIONS

*Patent Abstracts of Europe* (EP 227432) dated Jun. 1, 1987 "Force and torque Converter," by John A Hilton.
*Patent Abstracts of Europe* (WO 91/20022) dated Dec. 26, 1991 "Improvements to Joystick Assemblies" by Vincent Paul Ditton.
*Patent Abstracts of Europe* (WO 93/4348) dated Mar. 4, 1993 "Force and Torque Converter" by John A Hilton.

*Primary Examiner*—Thomas P. Noland
*Attorney, Agent, or Firm*—Ostrolenk, Faber, Gerb & Soffen, LLP

[57] ABSTRACT

An apparatus for providing translational and rotational control signals comprises a base; a handle; and a suspension system operable to resiliently couple the handle to the base such that the handle may be freely moved in translational and rotational directions relative to the base and to move the handle to a neutral position when no forces are applied to the handle. The suspension system includes a plurality of suspension members each having an orientation axis, the suspension members being disposed such that respective pairs of the orientation axes are orthogonal to each other; and a plurality of sensors, each sensor having a pair of sensor components, at least two sensors being coupled to each of the suspension members and operable to sense translational and rotational movement of the respective suspension member along its orientation axis, the sensors producing output signals indicative of the translational and rotational movement of the handle with respect to the base.

19 Claims, 4 Drawing Sheets

DEVICE FOR USE IN MANUAL CONTROL OF THE MOVEMENT OF A REAL OR IMAGINARY OBJECT

FIELD OF THE INVENTION

The invention relates to an apparatus for manual control of a real or imaginary object and is of the type in which an operator applies forces and torques to a handle.

BACKGROUND OF THE INVENTION

Apparatuses of the above type may be used in the same way as a commonly known "joystick". The operator grasps the handle of the apparatus and thereby applies forces which, both in respect of direction and size, reproduce the movement which the operator wants a controlled object to perform. As a function hereof the apparatus emits signals which contain unambiguous information—both in respect of direction and size about the strain applied by the operator to the handle and which can therefore be utilized by the controlled object or by an intermediate control system for operating accordingly.

A joystick often has a substantial degree of movability and is generally used with a high translational or angular movement of the handle of the joystick that it can distinctly be felt by the operator. The emitted signal is proportional to the movement of the handle, and the joystick is most often biased by a relatively weak return spring towards its neutral position. Apparatuses of the type mentioned by way of introduction may, contrary to this, be designed in such a way that the handle is rigid or nearly rigid relative to the rest of the apparatus. A strain applied by the hand of the operator will not entail any noticeable or visible movement of the handle relative to the rest of the apparatus. Admittedly, even so rigid a construction will always move more or less when a force or a torque is applied, but the movement may be so small that it is not noticeable to the operator.

In EP-B 227,432, U.S. Pat. No. 5,222,400 and WO 93/4348 an apparatus is disclosed, in which six arms in the form of leaf springs and radially positioned in three mutually orthogonal pairs are slidably seated in the handle, the arms of each pair extending along one and the same axis and the arms in combination connecting the handle with the support.

For detecting the movements of the handle the apparatus is provided with three pairs of sensing means for sensing the translation and the rotation of the handle relative to the support. The sensing means is, with respect to each arm, provided with a light source and a light sensor which are fastened to the frame by means of suspensions, as well as a movable shutter fastened to the remote end of the arm. Each pair of sensing means can thus sense displacement of the handle relative to the frame in the direction of one axis perpendicular to the axis which connects the two means of the pair, and rotation of the handle relative to the support about a third axis perpendicular to both these axes.

Said slidable seating is a condition for the translatory movability of the handle when the arms are arranged in the above-mentioned way; the arms are in practice not deformable in their longitudinal direction, and each pair of arms would otherwise oppose translatory movement of the handle along this axis.

The slidable seating is also a prerequisite for using arms in form of leaf springs, as they are practically not deformable in the direction transverse to the longitudinal axis of the arm and transversely to the desired direction of deformation; each pair of arms which extends along the same axis would otherwise oppose both rotation of the handle about one of the axis perpendicular to said axis and translatory movement of the handle along the second one of the axes perpendicular to said axis.

Such a slidable seating has been obtained by providing the end of each leaf spring (arm) with a ball engaging a slot in the handle in the form of a slit-shaped interspace between two plane-parallel walls, said interspace having the same diameter as that of the ball and extending in the plane of the leaf spring in question.

The slidable seating of the arms is theoretically ideal in respect of providing a correct resolution of the forces and torques applied by the operator to the handle into unambiguously corresponding deflections of the six leaf springs, but entails, however, several considerable, practical drawbacks.

One considerable drawback of the construction is that it is mechanically complicated, as it consists of many mechanical components which are to be assembled when the apparatus is manufactured, which makes the manufacture difficult. In this connection, the apparatus cannot be divided into subassemblies or groups of components which in a simple way can be exchanged when repairing. The apparatus is, to judge from the publications, to be assembled from the inside and towards the outside, all its individual parts having to be mounted in a fixed order.

Another considerable drawback is that the sliding bearing, where the leaf springs engage the shell of the ball—unless it has been manufactured with a precision which is virtually unattainable—would cause an undesired mechanical play. The play may also occur under use by wear and tear of the bearing parts, a possible high precision in the bearing thus being ruined. This precision may also be ruined by the fact that apparently some of the interspaces are positioned in zones, where the ball-shaped handle is divided in two parts.

The play may i.e. cause the ball to "rattle" where it is engaging the ball shell, such that the whole construction, when exposed to vibrations, has unpredictable mechanical resonance frequencies and strong resonance oscillations. The apparatus then becomes unfit for use in a vibration-filled environment. The play may also have the effect that it becomes unclear to the user where the neutral position ends and the starting of a movement begins. Furthermore, the presence of play will have the effect that the obtained movement of the periphery of the ball as a consequence of the application of a given torque or a given force becomes bigger than it was before the play arose.

Finally, it is a substantial drawback in this prior art apparatus that, to judge from the publications, it will be very vulnerable for an unintentional overloading. Even though there seems to be rigid arms limiting the deflection of the afore-mentioned arms, this limitation takes place some distance from the ends of these movable arms, and the remote part of the arms with the ball is thus completely unprotected against overloading.

From WO-PA 95/3527 an apparatus of the same type is known, in which three arms which are placed radially in the same plane and connect the handle with the support are slidably seated in the handle.

This slidable seating is likewise a condition for translatory mobility in certain directions of the handle with this arrangement of the arms: the arms are in practice not deformable in their longitudinal direction, and each arm would otherwise oppose translatory movement of the handle along its longitudinal direction.

The slidable seating is presumably a prerequisite for unambiguously detecting the deflection of the arms. This cannot, however, be said with certainty, as the publication is very unclear in this respect.

The slidable seating has here been obtained by shaping the end of each arm (which has the shape of a thin rod) as a part of a spherical surface engaging a circular cylindrical bore with radial axis in the handle.

This slidable seating entails also in this case several considerable, practical drawbacks of the same kind as described above.

Even though this construction is less complicated than the one described above, it also comprises many mechanical elements which have to be assembled during the manufacture of the apparatus, which to judge from the publication has to take place from the inside towards the outside, all its individual parts having to be mounted in a certain order of succession.

SUMMARY OF THE INVENTION

The invention provides an apparatus of the type mentioned by way of introduction, in which apparatus the above-mentioned drawbacks have been eliminated, and simultaneously a good precision, reproducibility and resistance towards vibrations have been obtained, and which apparatus is particularly simple and cheap to manufacture.

This is obtained according to the invention by means of connecting suspension elements to both a support and a handle without the use of joints or bearings to obtain a jointless and solely elastically deformable suspension of the handle relative to the support. The resiliency is attained by the suspension elements themselves and/or their connections to the support and/or the handle, respectively, being resilient. As there are no joints or bearings demanding a high precision and being subject to wear and tear during use or by vibrational stress, the above-mentioned drawbacks have been eliminated, the suspension elements at the same time becoming simpler and cheaper to manufacture.

By forming the suspension elements integrally with a handle, a particularly simple and cheap embodiment of the jointless connections is obtained and a safe control of the two fastening means relative to each other during the handling of the suspension elements prior to their being mounted in the apparatus is achieved.

Making the suspension elements elongate and extending in an L-shaped curve ensures in a simple and cheap way the deformability of the suspension elements in all directions such that they do not oppose movement of the handle with respect to the support in the longitudinal directions of the elements.

According to another feature of the invention, the suspension elements are placed as remote as possible from each other within the possibilities given by the outer dimensions of the apparatus. Thus, a lesser sensitivity to torque compared to the sensitivity to translatory forces is obtained. Tests have shown that practically all test persons underestimate the torque they apply to such an apparatus compared to applied translatory strain, and such a reduced sensitivity is therefore desirable.

Moreover, this measure makes the elastic deformations correspondingly bigger by rotation of the handle, whereby an improved repetitive accuracy is attained and a better defined neutral position of the handle.

By including slits having variable widths, a considerable reduction of the undesirable light diffusing from the light source in one sensor means to the light sensor in a second sensor means is obtained. Thus, time multiplexing of the light of the various sensor means in the apparatus may be avoided.

By making the shutters integral with the fastening means, a particularly cheap embodiment of the shutters is obtained and at the same time a good reproducibility in their position relative to the fastening parts.

Another feature of the invention is to include a stop for the movement of the shutters when they are moved away from each other, which stop is simple and inexpensive. Tests and calculations have shown that these stops are strong enough to withstand even a sturdy person about to fall grasping the handle of the apparatus.

By fastening a light source and detector to one of the shutters, a simple and cheap mounting of light source and light sensor with good reproducibility is obtained.

By fastening a pair of sensor members to one of the shutters, a suspension member is obtained which constitutes one component which is easy and safe to handle; simple to mount and which can be quickly replaced for repair, the apparatus according to the invention becoming particularly simple to assemble during the manufacture and to disassemble for repair.

By making the distance between two sensor members which have been fastened to one shutter greater than about 80% of the extension of the sensor element, a more safe sensing of the rotation of the handle is obtained.

The invention also includes the feature that forces and torques along several mutually perpendicular axes can be sensed.

BRIEF DESCRIPTION OF THE DRAWINGS

The invention will be described in detail in the following by means of embodiments with reference to the drawing, in which.

DETAILED DESCRIPTION OF THE INVENTION

Identical reference numbers are used for corresponding parts in all figures.

Figure 1:
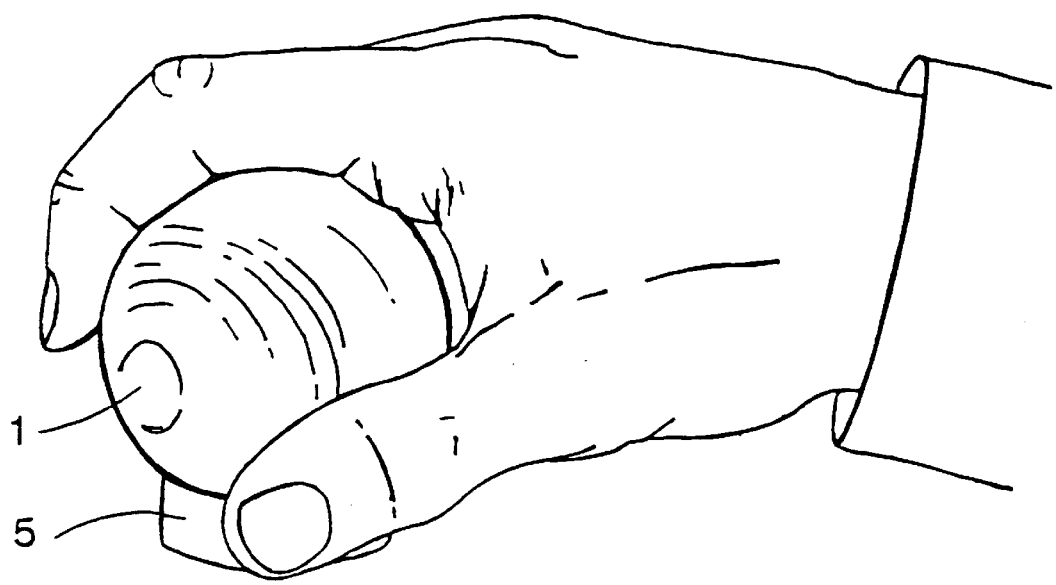
FIG. 1 shows a preferred embodiment of an apparatus according to the invention, FIG. 2 schematically shows a suspension member with two transducers for the apparatus according to FIG. 1.

FIG. 1 shows a preferred embodiment of an apparatus according to the invention. A ball-shaped handle 1 is suspended on a support 5, the lower part of which is visible in FIG. 1. The support 5 is fastened to a base not shown which is stationary and stable relative to the operator.

The apparatus according to the invention may for instance be used for control of a machine which can move in three dimensions, such as an excavator or the like, an operator pressing or twisting by a simple application of strain by the hand the handle of the apparatus in the direction and with the strength desired for the movement.

For control of such machines it is a substantial advantage of the apparatus that it is without bearings and joints, as these would substantially increase the risk of damage to the apparatus when used in cases where strong vibrations may occur.

The apparatus may also be used in a similar way in situations where a person is to control apparatuses, such as robot arms or manipulator arms, machine tools for processing in three dimensions, such as milling in connection with "fast prototyping", or movable objects, including imaginary objects which are shown on a computer display or the like. The apparatus will also be suitable in programming robots which are to simulate the movements of an operator.

The apparatus can also be used for control of vehicles, such as helicopters, manned or remote-controlled submarines and other crafts movable in three dimensions.

The applicability of the apparatus within other fields will be understood by a person skilled in the art.

The suspension of the handle 1 is disposed in such a way that the handle 1 can be moved slightly in all directions, both by translation and by rotation. The possible movements are, however, preferably so small that the operator does not perceive them when the apparatus is operated manually. The suspension is as far as possible ideally elastic, i.e. there is a proportional and unambiguous relationship between the strain applied to the handle by the operator and the resulting movement of the handle.

For sensing the strain applied to the handle by the operator it is thus sufficient to sense the resulting movements of the handle which may be resolved in displacement (translation) and turning (rotation).

Figure 2:
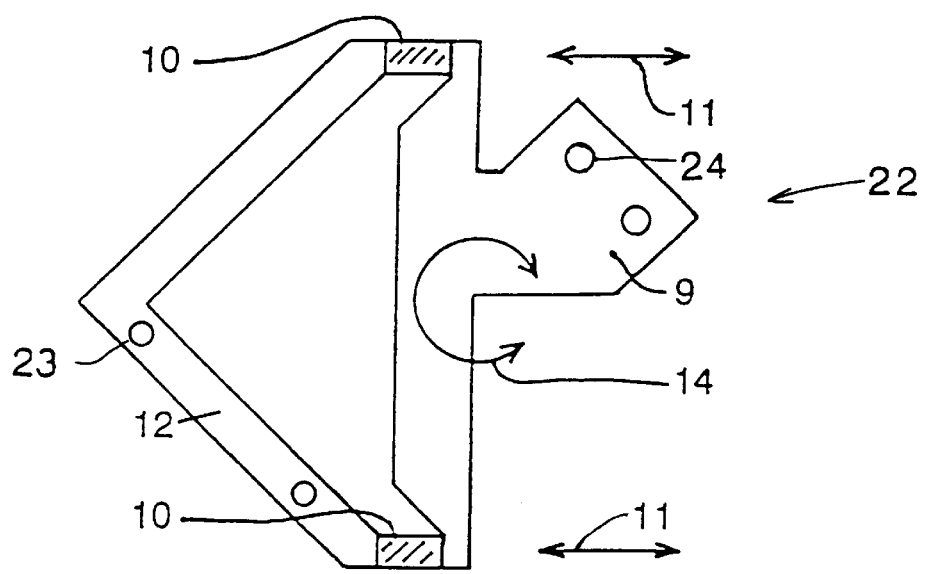

For detecting these movements—which as previously mentioned preferably are very small—a suspension member 22 like the one shown schematically in FIG. 2 is used in the embodiment shown. The suspension member 22 comprises two displacement sensor means and two suspension elements. These are in the figure shown schematically as the two hatched areas 10.

The suspension member 22 is substantially planar, extending in the plane of the drawing and is provided with two fastening parts, viz. an outer fastening part 12 and an inner fastening part 9, by means of which the suspension member can be fastened to the support and/or the handle, respectively, (or the reverse). In the embodiment shown the fastening parts 9, 12 are provided with bolt holes 23, 24 for fastening.

By means of the suspension member 22 shown in FIG. 2, forces can be detected in the direction 11, which is in the plane of the drawing, and torques in the direction of rotation 14, i.e. about axes perpendicular to the plane of the drawing. The strains are to be applied to the suspension member between the two fastening parts 9, 12, for instance such that the fastening part 12 is kept stationary and the strain, which is to be sensed, is applied to the second fastening part 9.

The resilient suspension elements, which are part of the two hatched areas 10, will deform if the suspension member is subjected to said strains, such that both suspension elements will deform by pull or pressure in opposite directions, if a torque in the rotational direction 14 is applied to the suspension member.

The deformations are sensed by the displacement sensor means arranged together with the suspension elements which emits a signal which is preferably electrical, when subjected to such a strain. The displacement sensor means in the areas 10 are preferably constructed in such a way that by deformation in the direction 11 they emit a significantly stronger signal than by deformation in other directions.

A person skilled in the art will realize that the pairs of suspension elements and displacement sensor means in practice constitute force transducers, and the function of the apparatus is easier to understand, if the hatched areas 10 are regarded as ideal force transducers.

Figure 3:
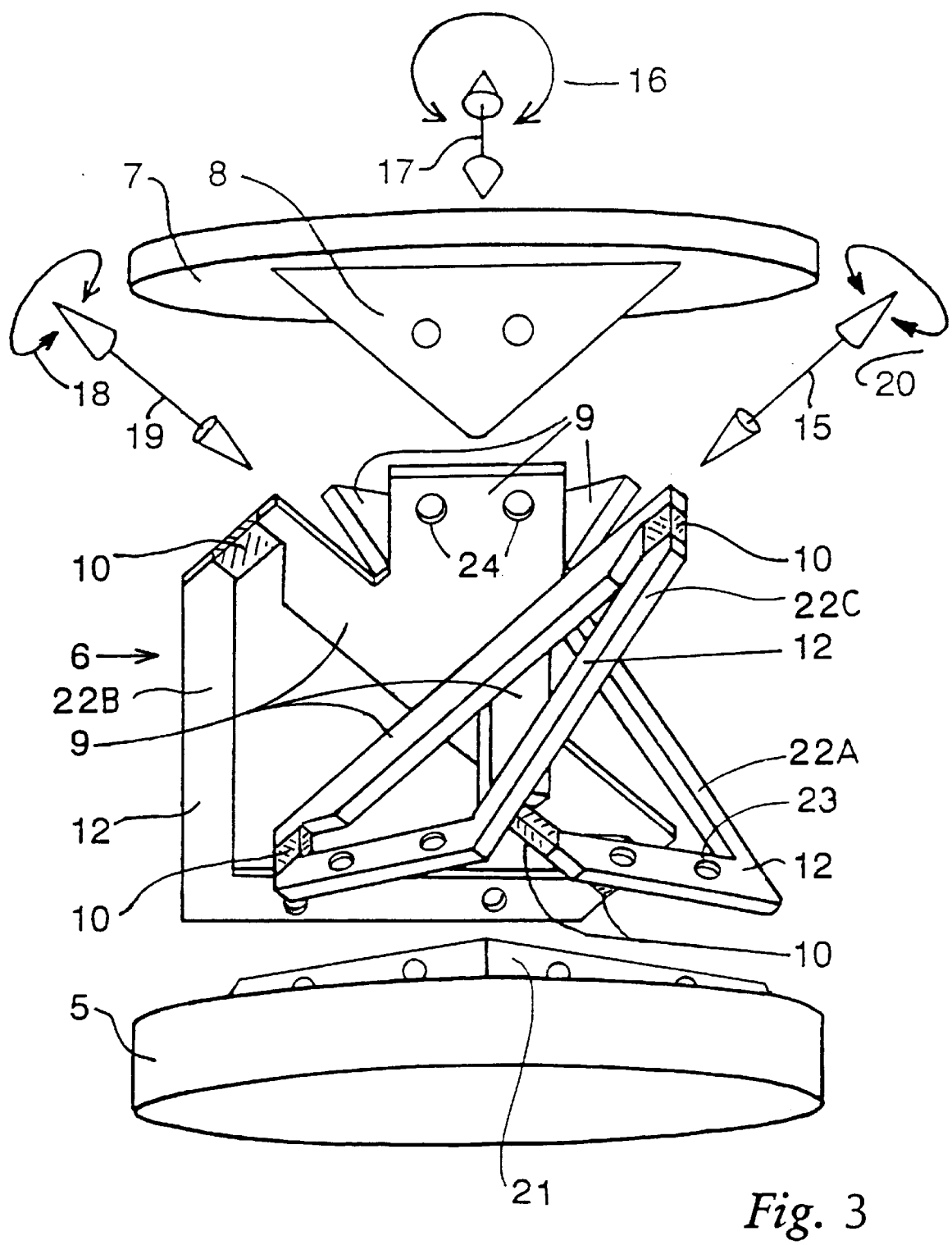
FIG. 3 is a schematic, exploded view of the interior structure of the apparatus according to FIG. 1.

Reference is now made to FIG. 3, which schematically shows the interior structure of an embodiment of the apparatus according to the invention. The main apparatus comprises a support 5, a construction 6 with three suspension members 22 and a handle 7 which the operator grasps. These three major parts 5, 6, and 7 are for the sake of clearness shown disassembled from each other in FIG. 2.

The three suspension members 22 are also designated by the letters A, B. and C, and are placed in mutually perpendicular planes. Three mutually perpendicular axes 15, 17, 19 are normal to these planes.

When looking at FIG. 3 it will be realized that the suspension member 22A can sense forces in the direction 19 and torques 20 about the axis 15; the suspension member 22B can sense forces in the direction 15 and torques 16 about the axis 7; and the suspension member 22C can sense forces in the direction 17 and torques 18 about the axis 19.

As a force in any direction may be resolved in force components in the three directions 15, 17, 19, and a torque about any axis may be dissolved in torque components in the three rotational directions 16, 18, 20 (i.e. in torque components about the three axes 17, 19, 15), any compound application of force and torque may be detected by the suspension members 22 and dissolved in components in three said mutually perpendicular directions.

By means of suitable data processing, for instance in a computer, the resolution into components may be transformed from or to any desired coordinate system, Cartesian, non-orthogonal or polar. There is thus no practical limitation of the orientation of the three suspension members shown in FIG. 3.

When assembling the apparatus according to the invention, the handle 7 is displaced downwards in FIG. 3, such that the triangular pyramid apex 8 abuts all three interior fastening parts 9, and the support 5 is displaced upwards in the figure, the frustum 21 of a triangular pyramid abutting all three outer fastening parts 12. The interior fastening parts 9 are fastened to the handle 7 and the outer fastening parts 12 are fastened to the support 5. The fastening may take place in any suitable way, for instance by means of screws, which are screwed into the pyramid 8 and the frustum 21 of the pyramid through the bolt holes 23 or 24, respectively. Gluing, soldering, moulding in place or welding may also be used.

The handle 7 is practically usable as the embodiment shown in FIG. 3, but a different and better design might easily be possible. In a practical embodiment the handle 7 may have the shape of a ball shell encompassing so much of the construction 6, that only the connection to the support 5 is not encompassed, and internally being provided with a triangular pyramid with the same shape as the pyramid 8 shown in FIG. 3. Thus, the apparatus assumes the preferred embodiment shown in FIG. 1.

It is seen from FIG. 3 that assembly and disassembly of the apparatus according to the invention may be performed in a very simply way. The suspension members 22 may thus be screwed one by one onto the support 5, whereafter the handle is screwed onto the suspension members. When the handle 1 is ball-shaped, as shown in FIG. 1, it is preferably shaped as an upper part of a ball, which on its bottom side has the triangular pyramid 8, in addition to a bottom part of a ball shell with an opening for the support 5, the lower part being placeable on the support from below and fastenable to the upper part in any way after the assembly of the apparatus.

Figure 4:
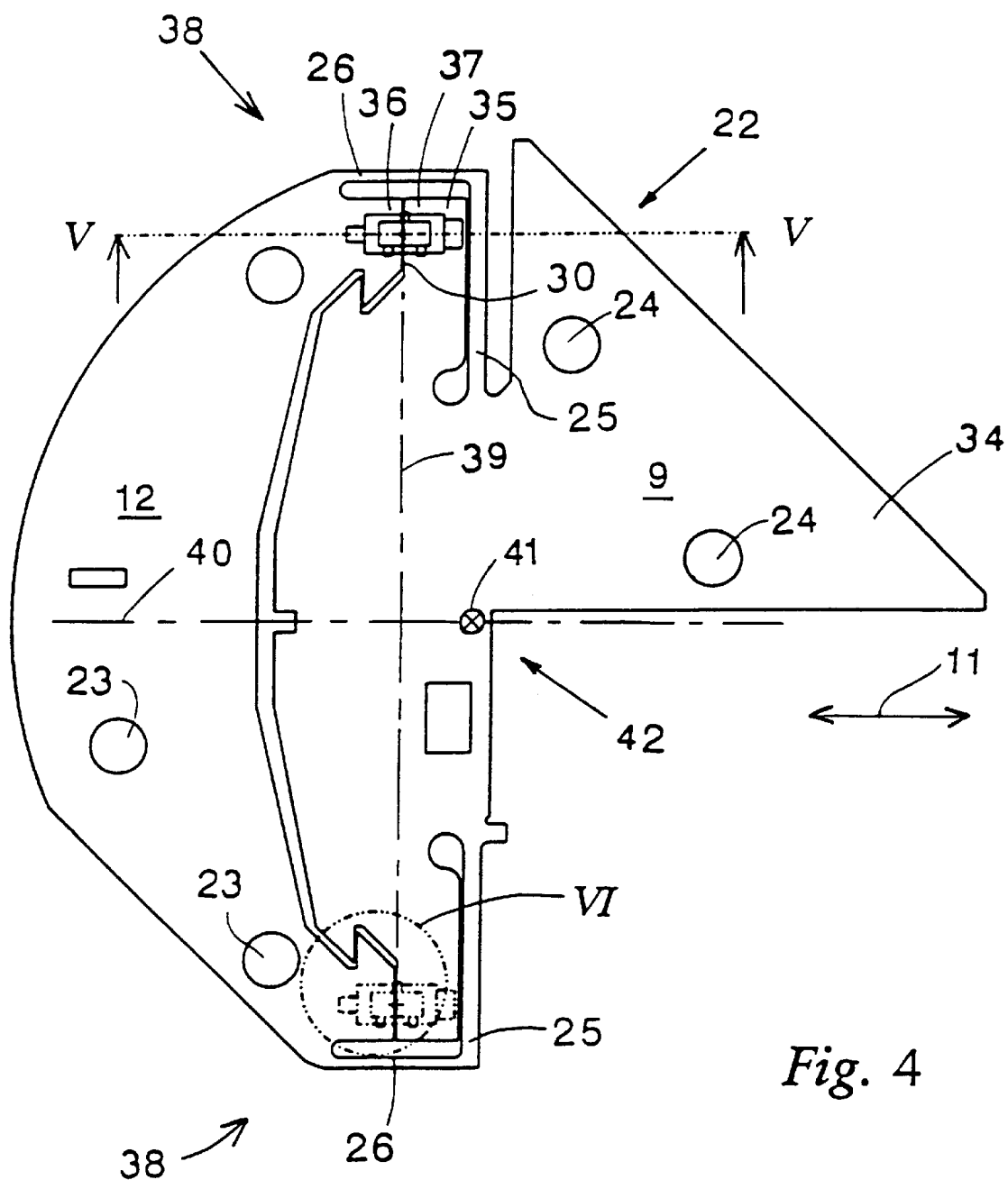
FIG. 4 shows the suspension member according to FIG. 2.

A preferred embodiment of a suspension member 22 according to the invention is shown in FIG. 4. The mechanical part of the suspension member 22 is in this embodiment cut from a single plate 34, preferably a plate of spring steel, the dimensions of which can be seen from FIG. 4.

The cutting is most preferably made by laser beam or water-jet cutting.

In this embodiment the suspension elements are elongate and substantially L-shaped, each comprising two straight portions 25 and 26. The portions 25 are made integrally with the interior fastening part 9 and the portions 26 integrally with the outer fastening part 12. Each portion 25 has the effect of a resilient, bendable bar.

It is important that the suspension elements be flexible in all directions, as they would otherwise opposed movement of the handle 1 in certain directions. This flexibility in all directions is exactly ensured by the L-shape 25, 26 shown in FIG. 4.

The plate 34 of the suspension member is designed with a right-angled cut-out 42 which makes it possible to place the three suspension members 22 orthogonally in the mutual engagement shown in FIG. 3, the cuttings 42 engaging each other.

Portions 35, 36 of the interior fastening part 9 and the outer fastening part 12, respectively, are positioned oppositely and form two slits 30 in between them. These portions 35, 36 constitute shutters. Together with photo-electric means 37 the shutters 35, 36 constitute two sensor means 38.

The suspension member 22 can sense forces along an axis 40 positioned in the plane of the plate 34 and perpendicular to an axis 39 connecting the two sensor means 38. The axis 40 corresponds to the direction 11 in FIG. 2. Moreover, the suspension member 22 can sense torques about axes 41 which are perpendicular to the axes 39 and 40. Torques about the axes 41 correspond to torques in the rotational direction 14 in FIG. 2.

Figure 5:
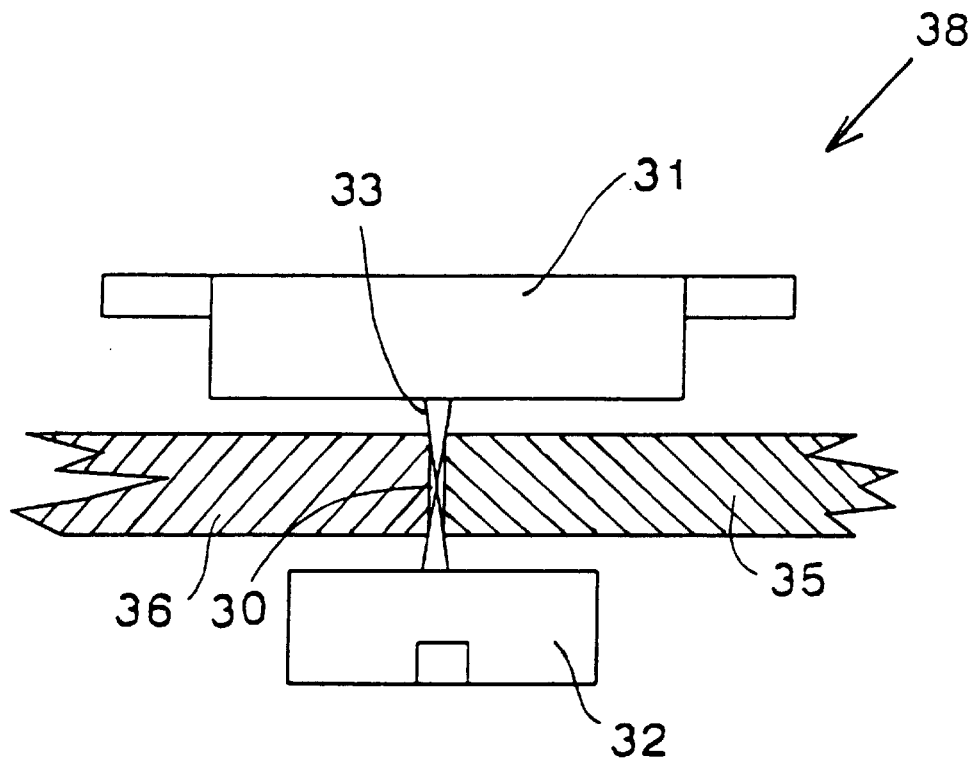
FIG. 5 is a sectional view according to the line V—V in FIG. 4 at a larger scale.
Figure 6:
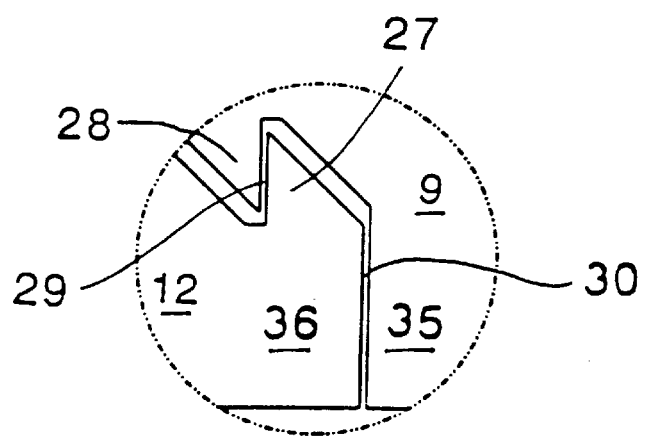
FIG. 6 shows the detail VI in FIG. 4 at a larger scale.

The structure of the sensor means 38 is shown more detailed in FIGS. 5 and 6.

FIG. 5 is a sectional view along the line V—V in FIG. 4. An optical transducer, more precisely a light emitter 32, such as a light-emitting diode LED, is in a manner not shown in detail mounted on the bottom side of the suspension member 22 fastened to one of the two shutters 35, 36 opposite the slit 30 between the shutters. A second optical transducer, more precisely a light-sensitive electronic component 31, such as a photodiode, is in the same way mounted on the top side of the suspension member 22, opposite the light-emitting diode LED 32. The diode emits a beam of light 33, which impinges on the photodiode 31 through the slit 30.

It is important that the distance between the sensor means is as big as possible to attain large signals and subsequently a high signal-to-noise ratio by rotation of the handle 1. This is made possible by use of as small components (light-emitting diodes 32 and photodiodes 31) as possible. Particularly suitable are SMD components (Surface Mounted Devices), as they are small in themselves. Suitable types are for instance the light-emitting diode from Siemens, LS S260-DO and the photodiode Siemens BP 104 S.

When the outer fastening part 12 and the interior fastening part 9 are pressed together (in direction towards each other) with a force in the direction 11, the portions 25 will deflect outwards, exerting a reaction spring force. By the deflection of 25 the slits 30 between the shutter 36 on the outer fastening part 12 and the shutter 36 on the interior fastening part 9 become narrower. When the force applied is suspended, the deflection of 25 will cease and the slit 30 will regain its original width. Contrary to this the slit 30 will become wider, if the applied force mentioned above goes in the opposite direction (pulls the fastening parts 9, 12 apart).

The photodiode 31 acts in this connection as a light meter measuring the light passing through the slit 30. When the width of the slit is reduced on account of an applied force, as described above, the width of the light bundle 33 is reduced, whereby the amount of light falling on the photodiode 31—and consequently its output signal—is correspondingly reduced. Contrary to this the output signal from the photodiode 31 is increased when the width of the slit 30 is increased.

FIG. 6 shows the slit 30 between the shutter 36 on the outer fastening part 12 and the shutter 35 on the interior fastening part 9. The slit will in itself limit the movement of the two fastening parts, when they are moved towards each other, the slit simply closes when the shutters contact with each other. Limitation of the movement away from each other of the two fastening parts is in a similar way made by two means 27, 28 formed in the plate 34 and engaging each other behind, a second slit formed between them. This limitation of the mutual movement of the two fastening means has by tests and calculations proved most effective, as it in itself can resist a force applied by a sturdy person about to fall and then grasping the handle of the apparatus.

When a force perpendicular to the axis 40 is applied to the fastening parts, i.e. not in the desired working direction of the suspension member 22, the portion 25 and/or the portion 26 of the suspension element will deflect in a direction which is dependent on the direction of the force. Thus, the shutters 35 and 36, which are opposite each other on each their side of the slit 30, will be displaced relative to each other, but in such directions that the effective distance between the shutters—and consequently the light transmittance—is only insignificantly changed.

Even though the suspension elements in the above embodiment are shown in the same number (six) as the sensor means and positioned immediately next to them, there is nothing preventing the suspension elements from being differently constructed or from being present in a different number. The flexible suspension system may for example be constituted by a flexible column extending along the vertical symmetry axis of the apparatus. The suspension members may then have a similar construction as described above provided that cut-outs be made in the interior fastening parts 9 around the symmetry axis of the apparatus.

I claim:

1. An apparatus for providing translational and rotational control signals, comprising:

a base;

a handle; and a suspension system operable to resiliently couple the handle to the base such that the handle may be freely moved in translational and rotational directions relative to the base and to move the handle to a neutral position when no forces are applied to the handle, the suspension system including:

a plurality of suspension members each having an orientation axis, the suspension members being disposed such that respective pairs of the orientation axes are orthogonal to each other;

a plurality of sensors, each sensor having a pair of sensor components, at least two sensors being coupled to each of the suspension members and operable to sense translational and rotational movement of the respective suspension member along its orientation axis, the sensors producing output signals indicative of the translational and rotational movement of the handle with respect to the base; and an interface operable to transfer the output signals from the sensors to a signal processing system.

2. The apparatus of claim 1, wherein each suspension member includes a first body portion having a first fastener coupled to the base and a second body portion having a second fastener coupled to the handle.

3. The apparatus of claim 2, wherein the first and second body portions are integrally formed from a common sheet of metal.

4. The apparatus of claim 2, wherein each suspension member includes an elongate and substantially L-shaped curved portion for integrally coupling the first and second body portions together.

5. The apparatus of claim 2, wherein each sensor includes:

a light source for one sensor component;

a light sensor for the other sensor component operable to receive an amount of light from the light source to produce some of the output signals;

a first shutter fixedly coupled to the first body portion of its respective suspension member; and a second shutter fixedly coupled to the second body portion of its respective suspension member, the shutters forming a slit having a width which varies in accordance with the movement of the handle with respect to the base, the slit increasing or decreasing the amount of light passing through the slit in accordance with the movement of the handle with respect to the base to affect the amount light received by the light sensor.

6. The apparatus of claim 5, wherein the first and second shutters are integral with their respective suspension members and formed from a common sheet of spring steel.

7. The apparatus of claim 5, wherein the sensor components of each sensor are coupled to one of the first and second shutters, external forces and torques producing the translational and rotational movement of the respective suspension members along their orientation axes to cause relative movement between the first and second fasteners resulting in the opening and closing of the width of the slit formed by the shutters.

8. An apparatus for providing translational and rotational control signals, comprising:

a base;

a handle; and a suspension system operable to resiliently couple the handle to the base such that the handle may be freely moved in translational and rotational directions relative to the base and to move the handle to a neutral position when no forces are applied to the handle, the suspension system including:

first, second and third suspension members, each having: (i) first and second substantially planar body portions on which a translational axis, a rotational axis, and a deformation axis are defined, said axes being orthogonal to one another; and (ii) a first fastener at the first body portion fixedly coupled to the base and a second fastener at the second body portion fixedly coupled to the handle, the suspension members being disposed such that the translational axes extend in different directions and such that the rotational axes extend in different directions;

two suspension elements disposed on each suspension member and operable to elastically couple the first and second body portions together at elastic deformation zones, the deformation zones being spaced apart from one another along the deformation axis, the suspension elements being operable to elastically deform in response to translational movement along the translational axis and rotational movement about the rotational axis of respective suspension members;

a plurality of sensors, each sensor having a pair of sensor components, at least one sensor being coupled to each of the suspension members and operable to sense translational and rotational movement of the respective suspension member along its respective first and second axes, the sensors producing output signals indicative of the translational and rotational movement of the handle with respect to the base; and an interface operable to transfer the output signals from the sensors to a signal processing system.

9. The apparatus of claim 8, wherein each suspension element includes an elongate and substantially L-shaped curved portion which couples the first and second body portions together.

10. The apparatus of claim 8, wherein the first and second body portions are integrally formed from a common sheet of metal.

11. The apparatus of claim 10, wherein the suspension elements are located at the perimeter of the sheet.

12. The apparatus of claim 10, wherein the sheet has a perimeter which is intersected by the deformation axis at two locations defining a distance between the locations, the two suspension elements being spaced apart along the deformation axis by at least 80 percent of the distance.

13. The apparatus of claim 10, wherein the sheet of each suspension member defines a plane, each plane being orthogonal to the others.

14. The apparatus of claim 8, wherein each sensor includes:

a light source for one sensor component;

a light sensor for the other sensor component operable to receive an amount of light from the light source to produce some of the output signals;

a first shutter fixedly coupled to the first body portion of its respective suspension member; and second shutter fixedly coupled to the second body portion, the shutters forming a slit having a width which varies in accordance with the movement of the handle with respect to the base, the slit increasing or decreasing the amount of light passing through the slit in accordance with the movement of the handle with respect to the base to affect the amount light received by the light sensor.

15. The apparatus of claim 14, wherein the first and second shutters are integrally formed with the respective first and second fasteners.

16. The apparatus of claim 15, wherein the first and second shutters and first and second fasteners are formed from a common sheet of spring steel.

17. The apparatus of claim 16, further including means located at the suspension elements for defining a maximum width that the slit may produce.

18. The apparatus of claim 16, wherein the sensor components of each sensor are coupled to one of the respective first and second shutters, external forces and torques producing the translational and rotational movement of the respective suspension members along their translational and rotational axes to cause relative movement between the first and second fasteners resulting in the opening and closing of the width of the slit formed by the shutters.

19. The apparatus of claim 14, wherein the light source and light sensor of each sensor are coupled to one of the first and second shutters of the respective suspension member.

* * * * *